US011831495B2

(12) United States Patent
Collins

(10) Patent No.: US 11,831,495 B2
(45) Date of Patent: Nov. 28, 2023

(54) HIERARCHICAL CLOUD COMPUTING RESOURCE CONFIGURATION TECHNIQUES

(71) Applicant: Perfect Sense, Inc., Reston, VA (US)

(72) Inventor: Jeremy Collins, Leesburg, CA (US)

(73) Assignee: Perfect Sense, Inc., Reston, VA (US)

(*) Notice: Subject to any disclaimer, the term of this patent is extended or adjusted under 35 U.S.C. 154(b) by 0 days.

(21) Appl. No.: 17/066,675

(22) Filed: Oct. 9, 2020

(65) Prior Publication Data

US 2021/0111949 A1    Apr. 15, 2021

Related U.S. Application Data

(60) Provisional application No. 62/912,736, filed on Oct. 9, 2019.

(51) Int. Cl.
*H04L 41/0803* (2022.01)
*G06F 9/50* (2006.01)
*H04L 41/22* (2022.01)

(52) U.S. Cl.
CPC ........ *H04L 41/0803* (2013.01); *G06F 9/5088* (2013.01); *H04L 41/22* (2013.01)

(58) Field of Classification Search
CPC .... H04L 41/0803; H04L 41/22; G06F 9/5088
See application file for complete search history.

(56) References Cited

U.S. PATENT DOCUMENTS

| | | | | |
|---|---|---|---|---|
| 10,402,227 | B1 * | 9/2019 | Kinney, Jr. | G06F 9/5077 |
| 11,086,685 | B1 * | 8/2021 | Koppes | G06F 9/45558 |
| 2008/0021985 | A1 * | 1/2008 | Belgaied | H04L 41/28 709/221 |
| 2013/0219380 | A1 * | 8/2013 | Rogers | G06F 8/71 717/172 |
| 2014/0169213 | A1 * | 6/2014 | Rickman | H04L 41/5041 370/254 |
| 2014/0173065 | A1 * | 6/2014 | Sears | H04L 41/145 709/221 |
| 2021/0067607 | A1 * | 3/2021 | Gardner | H04L 41/082 |

* cited by examiner

*Primary Examiner* — Younes Naji
(74) *Attorney, Agent, or Firm* — Fish & Richardson P.C.

(57) ABSTRACT

Techniques and systems are disclosed to provide a configuration tool that can be used to improve configuration of cloud-based network resources. In some implementations, data indicating (i) a present configuration state of a cloud computing resource, and (ii) a desired state configuration of the cloud computing resource is obtained. A determination is made that adjusting the cloud computing resource from the present state configuration to the desired state configuration includes executing one or more operations classified as likely involving user confirmation. A workflow representation is generated for configuring the cloud computing resource from the present state configuration to the desired state configuration. The workflow representation identifies a hierarchical arrangement of tasks to be performed. A user interface is provided for output to a computing device. The user interface enables a user to perceive the hierarchical arrangement of tasks to be performed in configuration of the cloud computing resource.

17 Claims, 10 Drawing Sheets

```
import ../init as _ aws: :vpc vpc
    cidr-block: "10.0.0.0/16"
    provide-ipv6-cidr-block: true
    tags: {
        Name: "instance example",
        Project: "Gyro"
    }
end aws: :internet-geteway internet-geteway
    vpc-id: $(aws: :vpc vpc | vpc-id)
    tags: {
        Name: "instance example",
        Project: "Gyro"
    }
end for zone, cidr in ['us-east-2a', '10.0.0.0/24', 'us-east-2b', '10.0.1.0/24']
    aws: :subnet "subnet-$(zone)"
```

FIG. 3A

```
aws::internet-gateway internet-gateway
  vpc-id: $(aws::vpc vpc | vpc-id)
  tags: {
    Name:    "instance example ",
    Project: "Gyro"
  }
end for zone, cidr in ['us-east-2a', '10.0.0.0/24', 'us-east-2b', '10.0.1.0/24']
  aws::subnet "subnet-$(zone)"
    vpc-id: $(aws::vpc vpc | vpc-id)
    availability-zone: $(zone)
    cidr-block: $(cidr)
    map-public-ip-on-launch: true
    tags: {
      Name:    "Gyro Demo - $(zone)",
      Project: "Gyro"
    }
  end
end
```

FIG. 3B

```
$ beam up instance.bc1

Looking for changes...

+ Create vpc 10.0.0.0/16 - vpc
+ Create internet gateway
+ Create security group - instance-example
    + Create ingress security rule - tcp [22 to 22] [0.0.0.0/0] allow inbound ssh traffic, ipv4 only
+ Create subnet 10.0.0.0/24 in us-east-2a
+ Create instance
+ Create instance Are you sure you want to create and/or update resources? (y/N) y Executing: + Create vpc 10.0.0.0/16 - vpc OK
Executing: + Create internet gateway OK
Executing: + Create security group - instance-example OK
Executing: + Create ingress security rule - tcp [22 to 22] [0.0.0.0/0] allow inbound ssh traffic, ipv4 only OK
Executing: + Create subnet 10.0.0.0/24 in us-east-2a OK
Executing: + Create instance OK
Executing: + Create instance OK
$
```

FIG. 4A

```
$ beam up instance.bc1

Looking for changes...

* Update vpc-0ba2f5a27f31dbf6b 10.0.0.0/16 - vpc (tags: +[Project => Dark Wolf])
* Update igw-01d246c8fe880e0f9 (tags: +[Project => Dark Wolf], +[Name => instance example])
* Update subnet-0d9e120d241b4ba32 10.0.0.0/24 in us-east-2a (tags: +[Project => Dark Wolf])

Are you sure you want to create and/or update resources? (y/N) y

Executing: * Update vpc-0ba2f5a27f31dbf6b 10.0.0.0/16 - vpc (tags: +[Project => Dark Wolf]) OK
Executing: * Update igw-01d246c8fe880e0f9 (tags: +[Project => Dark Wolf], +[Name => instance example]) OK
Executing: * Update subnet-0d9e120d241b4ba32 10.0.0.0/24 in us-east-2a (tags: +[Project => Dark Wolf]) OK
$
```

FIG. 4B

```
workflow replace-gateway affected-resource: [
    'aws: :instance gateway',
    'aws: :route gateway-route'
]

stage NEW
    description: "Creating a new gateway..."

aws: :instance gateway end aws: :route gateway-route
        instance-id: $(aws: :instance gateway | instance-id)
    end aws: :instance gateway-new
        ami-name: $(aws: :instance gateway | ami-name)
        instance-type: "t2.micro"
        subnet-id: $(aws: :subnet subnet | Subnet-id)
        security-group-ids: [$(aws: :security-group security-group | group-id)]
    end transition SWITCH
        input: "switch"
        prompt: "@|bold,magenta switch|@) Switch routes to the new gateway."
    end
```

FIG. 5

HIERARCHICAL CLOUD COMPUTING RESOURCE CONFIGURATION TECHNIQUES

FIELD

This specification generally relates to cloud infrastructure configuration software.

BACKGROUND

Cloud computing can refer to the on-demand availability of computer system resources, especially data storage and computing power, without direct active management by the user. Cloud infrastructure can include data centers available to many users over the Internet. Cloud infrastructure often have functions distributed over multiple locations from central servers. If the connection to the user is relatively close, a server providing a function to the user may be designated an edge server. The availability of high-capacity networks, low-cost computers and storage devices as well as the adoption of hardware virtualization, service-oriented architecture, and autonomic and utility computing has led to growth in cloud computing.

Many systems providing cloud computing capabilities often enable the execution of application package interfaces (APIs) to create, update, or delete cloud computing resources through, for instance, a cloud service provider. Cloud computing APIs provide various advantages, such as cross-platform compatibility, component integration over a cloud environment (e.g., databases, messaging systems, portals, storage components), enable enterprise software features, and/or provide control and/or distribution over cloud-based infrastructure.

SUMMARY

In general, techniques and systems disclosed herein provide a configuration tool that can be used to improve configuration of cloud-based network resources. For example, the configuration tool can codify operations that are often implicated in managing cloud computing resources as Infrastructure-as-Code (IaC) for different cloud-based network service providers, and thereby use command-line codes to create and manage cloud computing resources. The configuration tool can also employ configuration language to allow a user to define and manage network infrastructure in a simplified manner using specialized data representations. For example, the configuration tool can implement workflow representations to structure the provisioning and infrastructure management process associated with network infrastructure. As another example, the configuration tool can also group cloud resource definitions to create templates of complex cloud infrastructure and encapsulate their implementations into easily re-useable modules.

In some implementations, the system includes a configuration state processor that is capable of identifying changes between a present state configuration and a desired state configuration of a cloud computing resource as specified by a configuration file. If changes exist, the configuration state processor can also identify operations to be performed to transition the cloud computing resource from the present state configuration to the desired state configuration. The operations can be identified before a configuration procedure is initiated to provide a system administrator with a better sense of the operations to be performed, and any complications that may result during configuration. In this way, the configuration tool and the state configuration processor can be used to improve the planning and/or execution of a configuration procedure for a cloud computing resource.

The configuration tool can also be used to dynamically impart additional functionality and/or drive behavior to existing network infrastructure without requiring a user to re-write existing configurations for the network infrastructure. For example, the configuration tool can employ a set of text processing techniques to identify known tasks/operations in a configuration file without requiring then user to review the configuration file and manually identify tasks/operations to be performed.

The architecture of the system provides various improvements relative to other techniques that can be used to configure cloud-based network resources. For example, some configuration procedures often involve a user defining a configuration procedure based on an end result specified by a configuration file. A user manually identifies the tasks to be performed, and executes them without, for example, understanding the impact of each task until it has been performed. The system improves upon this by using a configuration state processor to generate an impact report for a configuration procedure prior to configuring the resource. The impact report can include anticipated impacts of the configuration procedure on the resource based on simulations performed by the system using the workflow representations. The system can generate and provide the impact report to the user in real-time so that the user can view the anticipated impacts at the point of configuration. A user can therefore use the configuration tool to more effectively plan a configuration procedure in a manner that improves speed, resource utilization, among other benefits. Because the user is provided with more information prior to a configuration procedure being performed, user validation of the configuration procedure is also improved.

As another example, other cloud computing systems often do not generate and present impact reports to users to allow them to assess the impact of any configuration changes the user is seeking to make on a cloud computing resource before the system actually implements the change. Such computing systems reveal the impact of the change to the user only when the change is implemented, resulting in performance problems when the impact is undesirable. By including techniques to assess the impact of a change and provide reports of that assessed impact to the user prior to implementing the configuration change, the disclosed system improves the functioning of cloud computing systems by minimizing disturbances to the system as a result of user changes to cloud computing resources. The pre-screening of changes prior to implementing the changes allows users seeking to change a cloud computing resource to only implement the change if it will not negatively impact the performance of the cloud computing system, thereby minimizing deleterious changes and improving the performance of the system.

In some implementations, a method includes the operations of: obtaining data indicating (i) a present configuration state of a cloud computing resource, and (ii) a desired state configuration of the cloud computing resource; determining that adjusting the cloud computing resource from the present state configuration to the desired state configuration includes executing one or more operations classified as likely involving user confirmation; based on the determination that adjusting the cloud computing resource from the present state configuration to the desired state configuration involves executing one or more operations classified as likely involving user confirmation, generating a workflow representation for configuring the cloud computing resource from the present state configuration to the desired state configuration, where the workflow representation identifies a hierarchical arrangement of tasks to be performed in configuration of the cloud computing resource; and providing a user interface for output to a computing device, where the user interface enables a user to perceive the hierarchical arrangement of tasks to be performed in configuration of the cloud computing resource.

One or more implementations can include the following optional features. In some implementations, the user interface enables the user to provide one or more user inputs to adjust the hierarchical arrangement of tasks to be performed in configuration of the cloud computing resource.

In some implementations, the hierarchical arrangement of tasks specified in the workflow representation indicates a sequence for executing tasks.

In some implementations, the hierarchical arrangement of tasks specified in the workflow representation indicates, for each of the tasks: a set of one or more operations to be performed during execution of a particular task; and one or more execution parameters associated with each of the operations included in the set of one or more operations.

In some implementations, the user interface enables the user to provide one or more user inputs to adjust values for the execution parameters.

In some implementations, the tasks specified by the hierarchical arrangement of tasks includes: a first task to delete an existing instance of the cloud computing resource; a second task to create a new instance of the cloud computing resource; and a third task to migrate one or more components presently configured to the existing instance to the new instance.

In some implementations, the method further includes the operations of: obtaining, from the computing device, data indicating a confirmation by the user to initiate adjustment of the cloud computing resource from the present state configuration to the desired state configuration; in response to obtaining the data indicating a confirmation by the user to initiate adjustment of the cloud computing resource from the present state configuration to the desired state configuration, generating a configuration instruction based on the workflow representation; and providing the configuration instruction to a configuration server associated with the cloud computing resource.

In some implementations, generating a configuration instruction includes: identifying, for each of the tasks within the hierarchical arrangement of tasks specified by the workflow representation, a set of one or more operations to be performed during execution of a particular task; determining a programming language used by the configuration server to configure the cloud computing resource; and generating the configuration instruction such that the configuration instruction is coded according to the programming language used by the configuration server to configure the cloud computing resource.

Other implementations of this and other aspects include corresponding methods, apparatus, and computer programs, configured to perform the actions of the systems, encoded on computer storage devices.

The details of one or more implementations are set forth in the accompanying drawings and the description below. Other features will be apparent from the description and drawings.

BRIEF DESCRIPTION OF THE DRAWINGS

FIG. 1A illustrates an example of an architecture of the system. FIG. 1B illustrates an example of a process for configuring one or more cloud computing resources using the system.

FIGS. 3A-3B illustrates examplary computer-executable languages that can be used to configure a cloud computing resource. FIG. 3A illustrates an example of a configuration language that can be used to define and manage the cloud computing resource. FIG. 3B illustrates an example of a programming language that can be used to support programming control structures for the cloud computing resource.

FIGS. 4A-4B illustrate examples of computer-executable code that can be executed by a configuration state processor. FIG. 4A illustrates an example of code that can be used to identify state changes of a cloud computing resource. FIG. 4B illustrates an example of code that can be used to detect attribute-level changes to a cloud computing resource that is supported by cloud-based resources.

FIG. 5 illustrates an example of a code representing a workflow representation for configuring a cloud computing resource.

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1A:
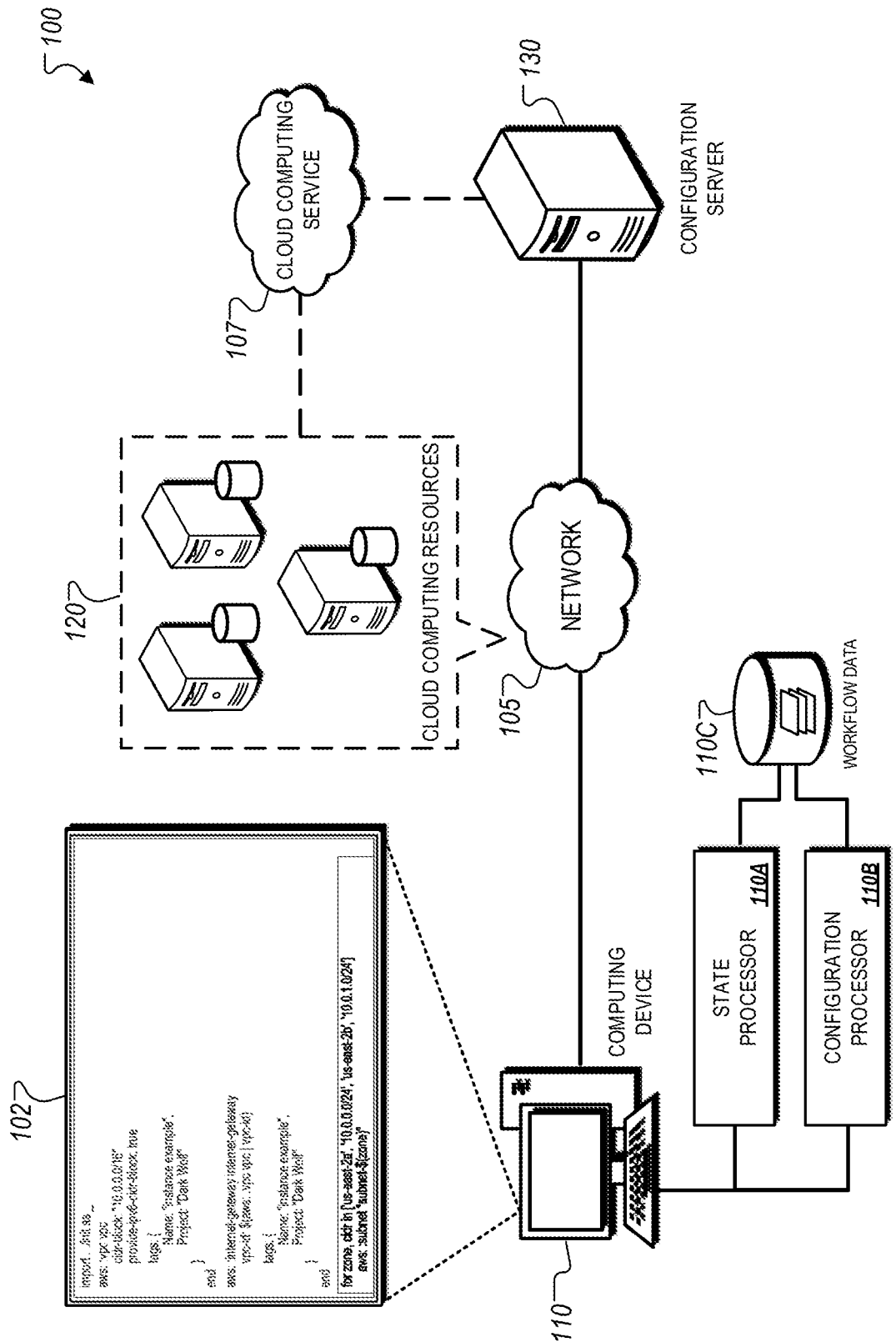
FIGS. 1A-1B illustrate an example of a system that is capable of providing a command-line tool for configuring a cloud computing resource.

In general, this specification describes a configuration tool that can be used to improve configuration of cloud-based network resources. For example, the configuration tool can codify operations that are often implicated in managing cloud computing resources as Infrastructure-as-Code (IaC) for different cloud-based network service providers, and thereby use command-line codes to create and manage cloud computing resources. The configuration tool can also employ configuration language to allow a user to define and manage network infrastructure in a simplified manner using specialized data representations. For example, the configuration tool can generate workflow representations to structure the provisioning and infrastructure management process associated with network infrastructure. As another example, the configuration tool can also group cloud resource definitions to create templates of complex cloud infrastructure and encapsulate their implementations into easily re-useable modules.

As described throughout, a "cloud computing resource" refers to a computer system resource that is accessible and/or made available through a cloud computing system or a cloud computing architecture. Examples of cloud computing resources include applications, servers (e.g., physical servers, virtual servers), data storage components, development tools, network capabilities, among others. A cloud computing resource is sometimes hosted at a remote data center managed by a cloud services provider (CSP). In some instances, access to a cloud computing resources can be provided by a CSP in association with a subscription-based service (e.g., a cloud computing resource can be made available for a monthly subscription fee based on usage).

As described throughout, "workflow representation" refers to a hierarchical arrangement of processes to be executed in implementing a configuration procedure of a cloud computing resource. For example, a workflow representation can specify a set of tasks to be executed, and a set of subordinate operations to be performed in executing each task included in the set of tasks. In this example, the tasks represent a higher-level sequence of processes whereas the operations represent a lower-level sequence of processes that are unique to an individual task. In this way, a workflow representation can be used to orchestrate the creation, management, or modification of cloud infrastructure into a sequence of pre-defined processes. As discussed below, processes specified within the hierarchal arrangement of the workflow representation can be coded into a specified configuration language executed by a configuration tool. The hierarchal arrangement specified by the workflow representation can provide a logical representation of pre-defined transitions (e.g., between individual tasks within a specified sequence) and pre-defined decision points (e.g., determining when to configure a new instance of a resource).

As described throughout, "real-time" refers to information or data that is collected and/or processed instantaneously with minimal delay after the occurrence of a specified event, condition, or trigger. For instance, "real-time data" refers to data, e.g., configuration data, that is processed with minimal delay after a computing device collects or senses the data, e.g., through a user interface. The minimal delay in collecting and processing the collected data is based on a sampling rate or monitoring frequency of the computing device, and a time delay associated with processing the collected data and transmitting the processed data over a network (e.g., between 5-100 ms).

Figure 1B:
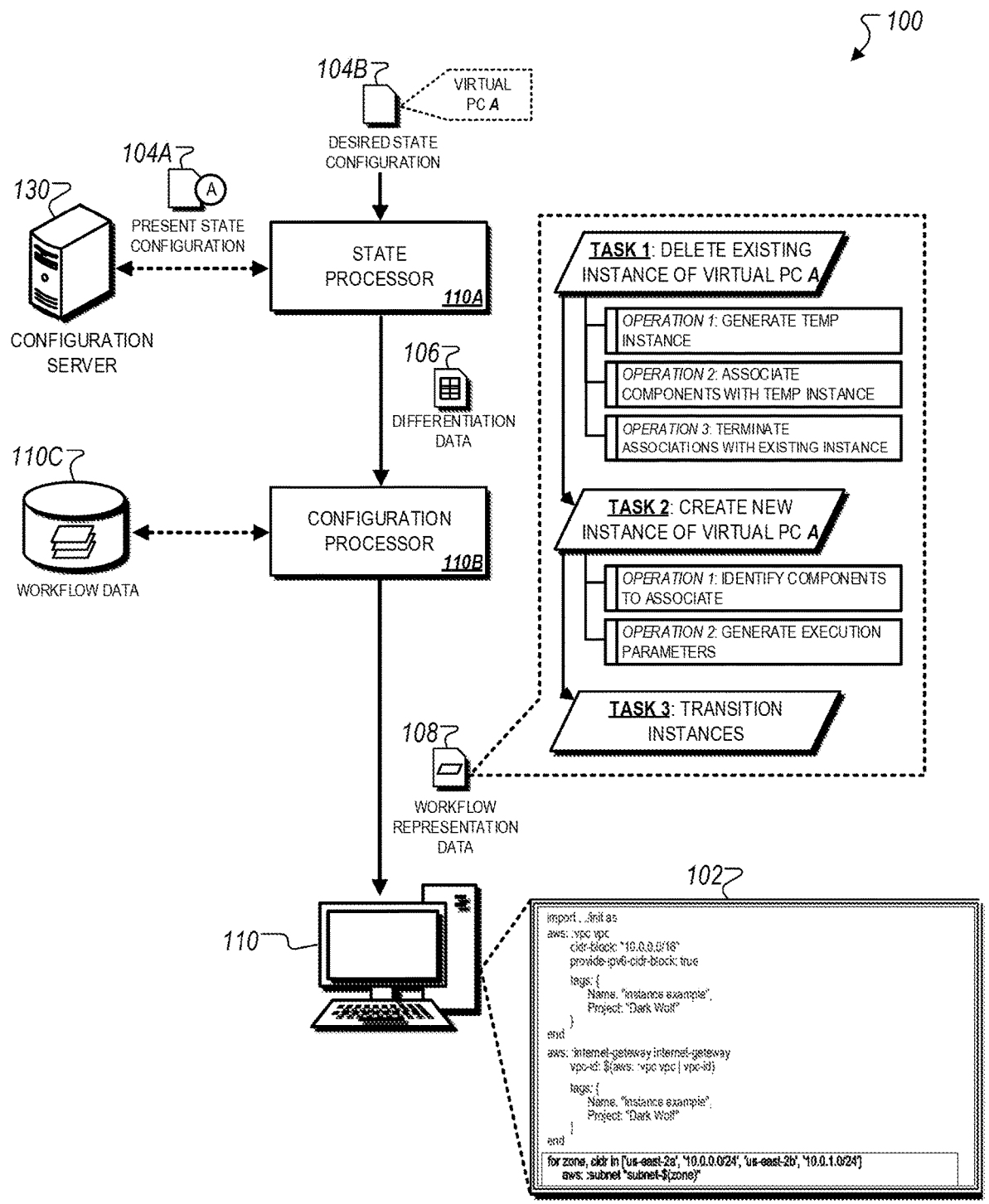

FIGS. 1A-1B illustrate an example of a system 100 that is capable of providing a command-line configuring tool for configuring a cloud computing resource. Referring initially to FIG. 1A, an architecture of the system 100 is depicted. The system 100 includes computing device 110, cloud computing resources 120, and a configuration server 130 that exchange communications over a network 105. The configuration server 130 and the cloud computing resource 120 can optionally be associated with a cloud computing server 107. The computing device 110 includes a state processor 110A and a configuration processor 110B. The computing device 110 can also store workflow data 110C, which can be used in configuring the cloud computing resources 120 using an interface 102, as discussed in detail below.

In general, the system 100 can be used to manage cloud infrastructure associated with the cloud computing server 107. For instance, a user (e.g., a system administrator) can use the configuration processor 110B as a command-line tool on the computing device 110 to codify operations that are used in configuration procedures associated with managing the cloud computing resources 120. Examples of configuration procedures include, without limitation, deleting an existing instance of a cloud computing resource, creating a new instance of a cloud computing resource, replacing instances of cloud computing resources with limited or no downtime, or modifying a configuration associated with an existing instance of a cloud computing resource. As discussed below, the configuration processor 110B can employ configuration language to allow a user to define and manage the cloud computing resources 120 in a simplified manner using specialized data representations.

For example, the configuration processor 110B can generate workflow data 110C to structure the provisioning and infrastructure management process associated with the cloud computing resources 120.

Referring to the components of the system 100, the computing device 110 can include one or more of a desktop computing device, a laptop computing device, a tablet computing device, a smartphone, a wearable device, among other types of network-enabled personal computing devices. The computing device 110 displays a user interface 102 through which a user can access various functionalities associated with the software components of the computing device 110. In the example depicted in FIG. 1A, the interface 102 displays executable code associated with a command line tool that the user can use to configure the cloud computing resources 120.

The state processor 110A is a software module that runs on the computing device 110 and is configured to generate representations of differences between a present state configuration of a cloud computing resource and a desired state configuration of the cloud computing resource. For example, the desired state configuration can be one that is specified within a configuration file for a process for replacing a virtual machine between two physical servers with minimal or no downtime. The state processor 110A is engaged when a command is fired by the configuration module 112B. In some instances, where the configuration procedure involves provisioning new infrastructure, the state processor 110A will list all new resources that are to be creates. In other instances, where the configuration procedure involves updating existing infrastructure, the state processor 110A will list all resources have are being updated, and the new updated configurations of each resource. In some other instances, such as deletion of existing network infrastructure, the state processor 110A will display all resources have are being destroyed and/or have been deleted.

The configuration processor 110B is a software module that runs on the computing device 110 and is configured to provide a command line tool for creating and managing the cloud computing resources 120. The configuration processor 110B generates a set of workflow representations and stores them in workflow data 110C along with associated data. For example, the workflow data 110C can include a repository of previously generated workflow representations for prior configuration operations and execution data for the previously executed configuration operations. In some instances, the previously generated workflow representations can be used to automate the creation of a workflow representation for a subsequent configuration procedure to be executed. For example, the configuration processor 110B can determine that a subsequent configuration procedure involves the same type of configuration of the same cloud computing resource as a previously performed configuration procedure. Based on this determination, the configuration processor 110B can generate a workflow representation data that includes the set of task specified by the workflow representation generated for the previously performed configuration procedure. The user can adjust the workflow representation data as necessary for the configuration procedure to be performed. In this way, the repository within the workflow data 110C can be used to iteratively develop a library of workflow representations that specifies patterns associated with configuration procedures performed over time. The configuration processor 110B can simplify the configuration of the cloud computing resources 120.

The workflow representations can be used to orchestrate the creation and management of the cloud computing resources 120 and enable a user to more effectively plan a configuration procedure. For example, the configuration processor 110B can display a workflow representation generated a configuration procedure through a single interface 102 so that the user can more easily identify transitions between tasks and decision points associated with the sequence of tasks. The user can modify the workflow representation based on reviewing the tasks and operations included in a hierarchical arrangement specified by the workflow representation.

Referring now to FIG. 1B, an example of a process for configuring one or more of the cloud computing resources 120 using the system 100 is depicted. In the example, a configuration procedure that involves migrating an existing instance of a virtual computer between different hardware platforms. The configuration procedure involves three tasks—(1) deleting an existing instance on an outdated hardware platform, (2) creating a new instance on a new hardware platform, and (3) transitioning configuration data associated with the existing instance to be associated with the newly created instance. In this example, each task can involve a set of operations representing subordinate processes to be performed within the scope of a particular task. For instance, the task of deleting the existing instance of a virtual computer can involve generating a temporary backup of the existing so that configuration data can be reverted if an issue occurs during the transitioning process.

In the exemplary configuration procedure depicted in FIG. 1B, the state processor 110A initially obtains present state configuration data 104A from the configuration server 130 and/or a local representation stored on the computing device 110. The present state configuration data 104A identifies an existing configuration of a cloud computing resource "virtual PC A." For example, the present state configuration data 104A can identify metadata representing a configuration for an instance of the "virtual PC A" operating over the cloud computing server 107.

The state processor 110A obtains desired state configuration data 104B. The desired state configuration data 104B identifies an configuration associated with a configuration procedure to be performed. As examples, the desired state configuration data 104B can indicate the creation of a new instance of the "virtual PC A" (e.g., transition from an existing instance to be terminated and a new instance to be created), a modification to an existing instance, (e.g., a new gateway), or deletion of the existing instance (e.g., to utilize to a new hardware platform).

The state processor 110A generates differentiation data 106 based on comparing the present state configuration data 104A and the desired state configuration data 104B. The differentiation data 106 identifies, for instances, a differences in respective configurations specified by the present state configuration data 104A and the desired state configuration data 104B. For example, if the desired state configuration data 104B identifies the creation of a new instance of a cloud computing resource (which does not exist within the present state configuration data 104A), then the differentiation data 106 can identify configuration information associated with the new instance. As another example, if the desired state configuration data 104B identifies an adjustment to an existing configuration of a cloud computing resource specified in the present state configuration data 104A, then the differentiation data 106 can identify only those aspects of the existing configuration that reflect the adjustment (e.g., changes in a network parameter, Internet gateway, instance name, security group, etc.). the The configuration processor 110B generates workflow representation data 108 based on differentiation data 106 and workflow data 110C. The workflow representation data 108 specifies a hierarchical arrangement of tasks and operations for implementing a configuration procedure associated with the desired state configuration data 104B.

As shown in FIG. 1B, the workflow representation data 108 specifies a first level within the hierarchical arrangement as a sequence of three tasks, such as "delete an existing instance of virtual PC A," "create a new instance of virtual PC A," and "transition instances." The execution of these tasks coincides with a configuration procedure that, for instances, adjusts a virtual PC to operate with different hardware platforms requiring transitioning of an existing instance (i.e., transitioning from an existing instance running on a first hardware platform to a new instance to be run on a second hardware platform).

The workflow representation data 108 also specifies a second level within the hierarchical arrangement as a sequence of operations to be performed in executing each of the three tasks in the first level. For example, execution of "task 1" involves the operations of "generating a temporary instance," "associating component with the temporary instance," and "terminating associations with the existing instance." As another example, execution of "task 2" involves the operations of "identifying components to associate" and "generating execution parameters." In this way, the multiple levels within the hierarchical arrangement enable a user to perceive logical relationships between different processes involved in implementing a configuration procedure for a cloud computing resource, thereby improving the planning and/or execution of the configuration procedure. The workflow representation data 108 can be used to orchestrate the creation and management of a cloud computing resources and enable a user to more effectively plan a configuration procedure.

The configuration processor 110B provides the workflow representation data 108 to the computing device 110, which is used by the computing device 110 to provide the interface 102 for output. The user interface 102 enables a user to access various functionalities associated with the software components of the computing device 110. For example, the user interface 102 can display the workflow representation shown in FIG. 1B so that the user can more easily identify transitions between tasks and decision points associated with the sequence of tasks. The user can modify the workflow representation based on reviewing the tasks and operations included in a hierarchical arrangement specified by the workflow representation.

Figure 2:
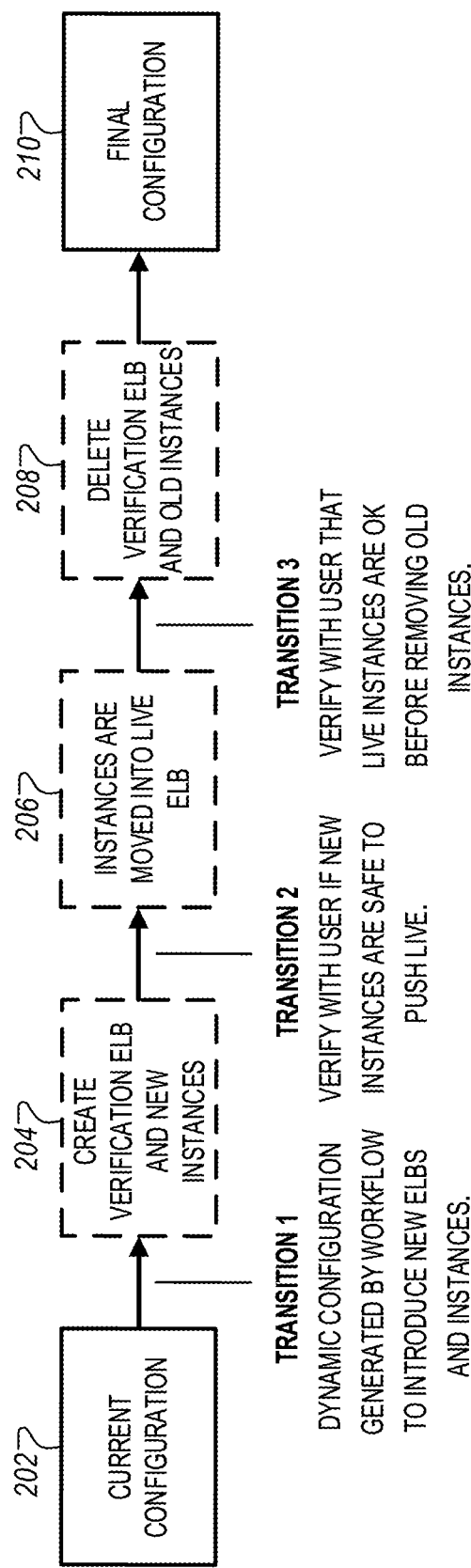
FIG. 2 illustrates examples of transitions within a configuration procedure for a cloud computing resource.

FIG. 2 illustrates examples of transitions within a configuration procedure for a cloud computing resource. The configuration procedure depicted in FIG. 2 involves three transitions representing the execution of tasks necessary to configure a cloud computing resource from a current configuration 202 an adjusted configuration 210. As described throughout, the configuration procedure can involve, for instance, loading a cloud computing resource, replacing a cloud computing resource, deleting a cloud computing resource, creating a new cloud computing resource, modifying an existing cloud computing resource, among others.

As shown in FIG. 2, a first transition involves generating a dynamic configuration for a cloud computing resource based on its current configuration 202. The dynamic configuration is represented as a workflow representation that introduces new instances of associated cloud computing resources and elastic load balancing (ELB) components to be used in the configuration procedure. Examples of ELB components include application load balancers, network load balancers, and classic Load balancers, among other types of load balancers.

At step 204, the system uses the workflow representation from the first transition to create ELB components and new instances of associated resources. The creation of the ELB components can be used to improve certain aspects of executing the configuration procedure. For instance, the ELB components can provide the ability to handle volatile workloads and scale to millions of requests per second, enable support for static IP addresses (e.g., assigning one elastic IP address per subnet enabled for the ELB components), or enable support for registering targets by IP address, including targets outside a virtual PC for the ELB components). Other advantages can include enabling support for routing requests to multiple applications on a single virtual server instance (e.g., registering each instance or IP address with the same target group using multiple ports), providing support for containerized applications, or enabling support for monitoring the health of each service independently (e.g., as health checks defined at the target group level).

A second transition involves user verification of the new instances in a production environment. For example, once the new instances are created in step 204, the system can provide an interface (e.g., the interface 102) that identifies a list of operations to be performed in association with the new instances within a workflow representation. The user can then verify that the newly created instances and the associated operations are safe to implement in a production environment.

At step 206, the system moves the newly created instances into a live ELB. For example, the system can automatically distribute incoming application traffic across multiple targets, such as virtual server instances, containers, IP addresses, and other functions. The system can also handle the varying load of application traffic in a single availability zone or across multiple availability zones.

In some instances, the system can be configured to operate with various types of load balancers that features, such as high availability, automatic scaling, and robust security, to improve the likelihood that cloud computing resources are fault tolerant during the configuration procedure. For example, in some instances, the system employs an application load balancer for load balancing of HTTP and HTTPS traffic and provides advanced request routing targeted at the delivery of modern application architectures, including microservices and containers. In other instances, the system employs a network load balancer for load balancing of Transmission Control Protocol (TCP) and Transport Layer Security (TLS) traffic where extreme performance may be needed. In some other instances, the system employs a classic load balancer that provides basic load balancing across multiple virtual server instances and operates at both the request level and connection level.

A third transition involves user verification of the new instances in the production environment prior to deletion of the existing instances. For example, once the new instances are moved into a live ELB in step 206, the system can provide an interface (e.g., the interface 102) that identifies network and configuration statuses of the new instances running in the live ELB. The user can then verify that the newly created instances are operating and/or performing as expected within the production environment.

At step 208, the system deletes previously existing instances associated with the current configuration 202 and associates the new instances running the live ELB with the adjusted configuration 210. Once this is accomplished, execution of the configuration procedure is complete.

FIGS. 3A-3B illustrates examples of computer-executable languages that can be used to configure a cloud computing resource. Referring initially to FIG. 3A, an example of configuration language that can be used to define and manage a cloud computing resource is depicted.

In the example, a user accesses an interface 300A to use configuration language to define and manage cloud resources. For instance, the user accesses configuration language provided through a command line tool to initiate a virtual machine "vpc" on a cloud service "aws.". The virtual machine instance is associated with metadata, such as a name "instance example" and a project "Gyro." The user also creates a network gateway "internet-gateway" and associates this gateway with the metadata of the virtual machine instance "vpc." Additionally, the use creates two subnet zones "us-east-2a" and "us-east-2b" that are each associated with network traffic originating from and/or transmitted to distinct geographic regions (e.g., New York State, Washington D.C.). Once, the configuration language displayed through the interface 300A is executed, the virtual machine is configured in the manner described above. In this way, the interface 300A provides a user with a greater level of control in configuring a cloud computing resource than other network management software that disallows users with access to programming language.

Referring now to FIG. 3B, an example of programming language that can be used to support programming control structures for a cloud computing resource is depicted. The programming language supports the control structures using, for instance "if" and "for" loops in object-oriented code.

In the example, a user programs a "for" loop for the virtual machine instance "vpc" configured through the interface 300A. As shown, the interface 300B allows the user to use classless inter-domain routing (CIDR) notation blocks to write continuous ranges of IP addresses for each of the two subnet zones "us-east-2a" and "us-east-2b." In this example, the programming language is used to define egress rules that control Internet network traffic out of the virtual machine instance "vpc." Once implemented, each egress rule specifies a range of allowed ports for outward communication, and other virtual machines that are allowed to make use of that egress, by specifying the private IP addresses that are granted the egress.

FIGS. 4A-4B illustrate examples of computer-executable code that can be executed by a configuration state processor (e.g., the state processor 110A). Referring initially to FIG. 4A, an example of programming code that can be used to identify state changes of a cloud computing resource is depicted. In this example, the code enables a configuration state processor to compare a desired state configuration of cloud computing resources with instances resources that presently exist within cloud computing service, and displays the difference that may exist based on the comparison. The configuration state processor returns results of the comparison through the interface 400B so that the user can visualize each change involved in a configuration processor prior to the implementation of the desired state configuration. The user is requested to confirm the configuration procedure based on the displayed information, thereby providing an improved way to plan the execution of the configuration procedure prior its implementation.

Referring now to FIG. 4B, an example of code that can be used to detect attribute-level changes to a cloud computing resource that is supported by cloud-based resources is depicted. In this example, the code enables the configuration state processor to detect attribute level changes to a cloud computing resource when supported by a cloud computing service. In this context, a cloud computing service refers to a service provided by a CSP in providing access to a cloud computing resource. For example, a CSP can provide a service that enables monthly access to a database in which the cloud computing resource is an allocation of storage within the database.

As shown, the configuration state processor identifies three adjustments to the cloud computing resource—(1) updating a "Project" tag of the virtual machine instance "vpc" to "Gyro," (2) adjusting a present configuration of an associated internet gateway so that the "Project" tag references "Gyro" and the "Name" tag references "instance example," and (3) adjusting a present configuration of the subnet zones "us-east-2a" so that it is associated with the tags updated in (2) and "Project" tag references "instance example." A user is requested to confirm the changes to be made. Upon receiving a user confirmation to execute the configuration procedure, the configuration processor performs the three adjustments as specified in the code.

FIG. 5 illustrates an example of a code representing a workflow representation for configuring a cloud computing resource. In the example, a workflow representation "replace-gateway" can be used to adjust the configuration of two affected cloud computing resources, an instance "gateway" and a route "gateway-route." As described throughout, the workflow representation specifies a hierarchical arrangement of processes to be executed when implementing a configuration procedure. For example, the workflow representation "replace-gateway" identifies a single stage "NEW" as a higher-level process for creating a new gateway. The workflow representation "replace-gateway" also identifies four lower-level subordinate processes that are to be performed in implementing the stage. The first subordinate process involves ending an existing instance "gateway." The second subordinate process involves ending an existing route "gateway-route." The third subordinate process involves creating a new instance "gateway-new" to replace the existing instance "gateway." The fourth subordinate process involves transitioning network traffic associated with the instance "gateway" so that traffic associated with the route "gateway-route" is transitioned from "gateway" to "gateway-new" with reduced disruption or impact.

Figure 6:
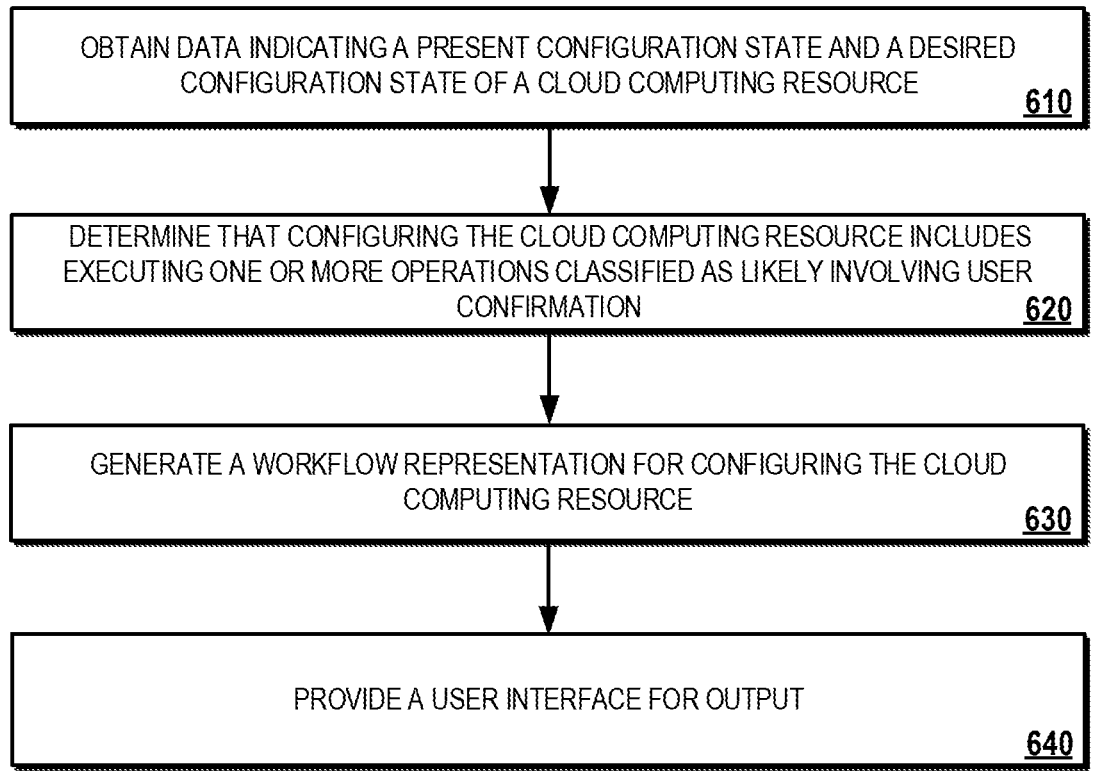
FIG. 6 illustrates an example of a process for generating a workflow representation of a configuration procedure for a cloud computing resource.

FIG. 6 illustrates an example of a process 600 for generating a workflow representation of a configuration procedure for a cloud computing resource. Briefly, the process 600 includes the operations of obtaining data indicating a present configuration state and a desired configuration state of a cloud computing resource (610), determining that configuring the cloud computing resource includes executing one or more operations classified as likely cloud computing user confirmation (620), generating a workflow representation for configuring the cloud computing resource (630), and providing a user interface for output (640).

In more detail, the process 600 includes the operation of obtaining data indicating a present configuration state and a desired configuration state of a cloud computing resource (610). For example, the configuration server 130 can receive a configuration file that indicates a present configuration state of a cloud computing resource included in the cloud computing resources 120. The configuration file can also indicate a desired state configuration state of the cloud computing resource. In this example, the cloud computing resource can be a virtual machine that runs on cloud-based hardware and accesses network services provided through the cloud computing server 107. The desired configuration state represents a configuration of the virtual machine after a configuration procedure has been performed. For instance, the configuration file can indicate that the hardware on which the virtual machine runs needs to be adjusted, which necessitates a migration of the virtual machine to new hardware.

The process 600 includes the operation of determining that configuring the cloud computing resources includes executing one or more operations classified as likely involving user confirmation (620). For example, the configuration server 130 can determine that configuring the cloud computing resource from the present state configuration to the desired state configuration involves executing one or more operations classified as likely involving user confirmation. For instance, the configuration can represent migration of a virtual machine, which the configuration server 130 determines involves three operations—(1) stopping a current instance of the virtual machine on current hardware, (2) initializing new hardware, and (3) starting a new instance of the virtual machine on the new hardware. In this example, the configuration server 130 determines that these operations involve user confirmation since they involve stopping a current instance of the virtual machine, which impacts other cloud computing resources that have dependencies to the virtual machine. For example, if a software application is executed on the virtual machine, then stopping the current instance of the virtual machine during configuration will terminate the software application (thereby affecting users that are presently using the software application).

The process 600 includes the operation of generating a workflow representation for configuring the cloud computing resource (630). For example, the configuration server 130 can generate a workflow representation for configuring the cloud computing resource from the present state configuration to the desired state configuration specified by the configuration file. As described throughout, the workflow representation identifies a hierarchical arrangement of tasks to be performed in configuration of the cloud computing resource. For instance, in the example referenced above in steps 610 and 620, the workflow representation can specify three tasks that represent (1) stopping a current instance of the virtual machine on current hardware, (2) initializing new hardware, and (3) starting a new instance of the virtual machine on the new hardware. The workflow representation is used to orchestrate the creation and management of the virtual machine into a sequence of pre-defined operations.

In some implementations, the hierarchical arrangement of tasks specified in the workflow representation indicates data for each of the tasks. For instance, the hierarchical arrangement can specify a set of one or more operations to be performed during execution of a particular task (e.g., sub-operations that are involved in executing a task). The hierarchical arrangement can also specify one or more execution parameters associated each of the operations included in the set of one or more operations (e.g., resource allocation for performing the operation, hardware identifiers for hardware to be modified during the operation, secondary resources that have dependencies to the resources that are impacted during the operation, etc.). In such implementations, the user interface 102 can allow the user to adjust values for the execution parameters. For example, the user can adjust the resource allocation for an operation to increase or decrease the prioritization in performing the operation.

The process 600 includes the operation of providing a user interface for output (640). For example, the configuration server 130 can provide the user interface 102 for output to the computing device 110 of the user. As discussed above, the user interface 102 enables the user to perceive the hierarchical arrangement of tasks to be performed in configuration of the cloud computing resource. Execution of the tasks can be coded into, for instance, the configuration processor 110B and displayed to the user through the user interface 102. A user can interact with the workflow representation displayed through the user interface 102 to view anticipated impacts of the configuration procedure, make any adjustments to the tasks specified by the workflow representation, or confirm that the tasks to be performed actually coincide with the desired state configuration specified by the configuration file.

In some implementations, the user interface 102 enables the user to provide one or more user inputs to adjust the hierarchical arrangement of tasks to be performed in configuration of the cloud computing resource. For example, the user can adjust the sequence of tasks that are specified by the workflow representation so that certain tasks are prioritized over others (e.g., initializing new hardware prior to terminating a current instance on existing hardware). In this example, a user can rearrange tasks that are not computationally dependent on each other. For instance, a user may be prevented from making adjustments that are not capable of being performed in the manner specified for the user (e.g., initiating a new instance of a virtual machine on new hardware prior to initializing the new hardware).

In some implementations, the process 600 includes additional steps. For example, the process 600 can include obtaining data indicating a confirmation by the user to initiate adjustment of the cloud computing resource from the present state configuration to the desired state configuration. For example, the user can provide an input through the user interface 102 that confirms that the configuration procedure should be performed as specified by the workflow representation. The process 600 can also include generating a configuration instruction based on the workflow representation. For example, the computing device 110 can generate the configuration instruction in response to obtaining the data indicating a confirmation by the user to initiate adjustment of the cloud computing resource from the present state configuration to the desired state configuration. Additionally, the process 600 includes providing the configuration instruction to a configuration server associated with the cloud computing resource. For example, the computing device 110 can provide the configuration instruction to the configuration server 130. The configuration server 130 can then configure the cloud computing resource in accordance with the configuration instruction.

In some implementations, generating the configuration instruction includes a set of steps. For instance, the set of steps include identifying a set of one or more operations to be performed during execution of a particular task. The set of steps also include determining a programming language used by the configuration server 130 to configure the cloud computing resource. Additionally, the steps include generating the configuration instruction such that the configuration instruction is coded according to the programming language used by the configuration server 130 to configure the cloud computing resource. In this way, the configuration instruction is customized to the programming language used by the configuration server 130.

Figure 7:
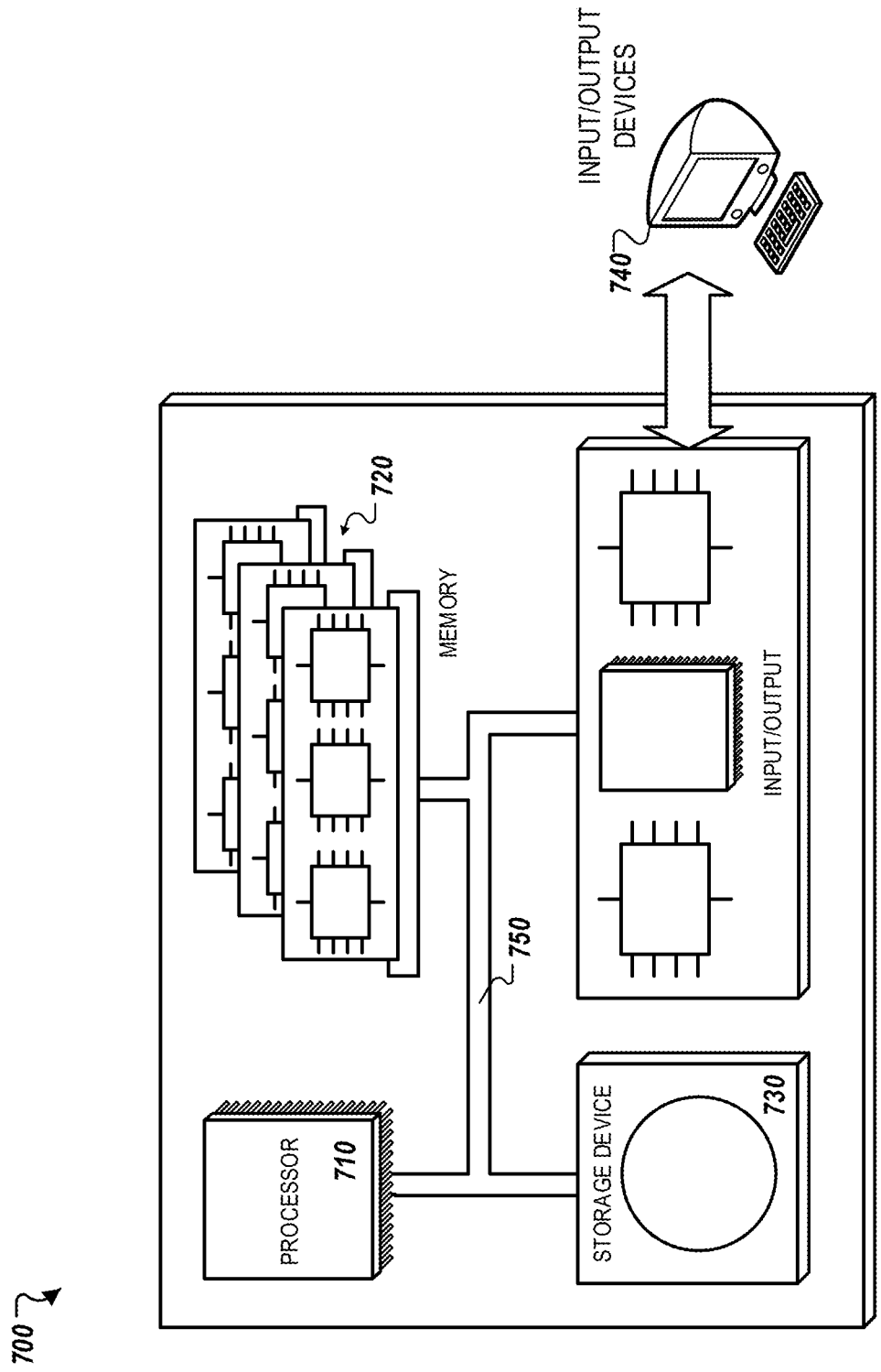
FIG. 7 is a block diagram of computing devices on which the processes described herein, or portions thereof, may be implemented.

FIG. 7 illustrates a schematic diagram of a computer system 700 that can be applied to any of the computer-implemented methods and other techniques described herein. The system 700 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 700) and their structural equivalents, or in combinations of one or more of them. The system 700 is intended to include various forms of digital computers, such as laptops, desktops, workstations, personal digital assistants, servers, blade servers, mainframes, and other appropriate computers, including vehicles installed on base units or pod units of modular vehicles. The system 700 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that can be inserted into a USB port of another computing device.

The system 700 includes a processor 710, a memory 720, a storage device 730, and an input/output device 740. Each of the components 1010, 1020, 1030, and 740 are interconnected using a system bus 750. The processor 710 is capable of processing instructions for execution within the system 700. The processor can be designed using any of a number of architectures. For example, the processor 710 can be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment. Examples of such programming language include Java, PHP, ASP.NET, Python, Golang, Ruby, Node.js, among others.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method performed by one or more computers, the one or more computers being configured to execute a command-line tool for configuring a cloud computing resource and comprising a state processor and a configuration processor, the method comprising:

obtaining, by the state processor, data indicating (i) a present configuration state of the cloud computing resource, and (ii) a desired state configuration of the cloud computing resource;

determining, by the state processor, that adjusting the cloud computing resource from the present state configuration to the desired state configuration comprises executing one or more operations classified as involving user confirmation;

based on the determination that adjusting the cloud computing resource involves executing, the one or more operations, generating a workflow representation for configuring the cloud computing resource from the present state configuration to the desired state configuration, wherein:
      the workflow representation identifies a hierarchical arrangement for a set of tasks to be performed in configuration of the cloud computing resource,
      the set of tasks comprises (i) a first task that a user is permitted to configure through a user interface associated with the command line tool, the first task implemented on a first hardware platform, and (ii) a second task that the user is restricted from configuring through the user interface, the second task implemented on a second hardware platform that is different than the first hardware platform;

receiving, by the configuration processor and through the user interface, a user input associated with the set of tasks, wherein the user input specifies one or more configurations to the set of tasks specified by the workflow representation;

determining, by the configuration processor, that the user input specifies a configuration corresponding to the second task;

in response to determining that the user input specifies the configuration to the second task:
      identifying, by the configuration processor, one or more template workflow representations from a repository of previously-generated workflow representations for prior configuration operations that configure the cloud computing resource from the present state configuration to the desired state configuration but do not include the second task;
      providing, by the configuration processor and through the user interface, an indication for the user to replace the workflow representation with the one or more template workflow representations;

receiving, by the configuration processor and through the user interface, a second user input selecting a template workflow representation from the one or more template workflow representations, wherein the template workflow representation selected by the user is associated with a second set of tasks;

in response to receiving the second user input, configuring, by the configuration processor, the cloud computing resource according to the template workflow representation selected by the user.

2. The method of claim 1, wherein the hierarchical arrangement of tasks specified in the workflow representation indicates a sequence for executing the set of tasks.

3. The method of claim 2, wherein the hierarchical arrangement for the set of tasks specified in the workflow representation indicates, for each task included in the set of the tasks:
- a set of one or more operations to be performed during execution of a particular task; and one or more execution parameters associated with each of the one or more operations included in the set of one or more operations.

4. The method of claim 3, wherein the user interface enables the user to provide one or more user inputs to adjust values for the one or more execution parameters.

5. The method of claim 1, wherein the set of tasks specified by the hierarchical arrangement of tasks comprises:
- the first task to delete an existing instance of the cloud computing resource;
- the second task to create a new instance of the cloud computing resource; and
- a third task to migrate one or more components presently configured to the existing instance to the new instance.

6. The method of claim 1, further comprising:
- obtaining, through the user interface, data indicating a confirmation by the user to initiate adjustment of the cloud computing resource from the present state configuration to the desired state configuration;
- in response to obtaining the data indicating a confirmation by the user to initiate adjustment of the cloud computing resource from the present state configuration to the desired state configuration, generating a configuration instruction based on the workflow representation; and
- providing the configuration instruction to a configuration server associated with the cloud computing resource.

7. The method of claim 6, wherein generating the configuration instruction comprises:
- identifying, for each task within the hierarchical arrangement of the set of tasks specified by the workflow representation, a set of one or more operations to be performed during execution of a particular task;
- determining a programming language used by the configuration server to configure the cloud computing resource; and
- generating the configuration instruction such that the configuration instruction is coded according to the programming language used by the configuration server to configure the cloud computing resource.

8. A system comprising:
- one or more computing devices configured to execute a command-line tool for configuring a cloud computing resource, and comprising a configuration state processor and a configuration module; and
- a non-transitory computer-readable storage device storing instructions that are executable by the one or more computing devices to perform operations comprising:
  - obtaining, by the state processor, data indicating (i) a present configuration state of the cloud computing resource, and (ii) a desired state configuration of the cloud computing resource;
  - determining, by the state processor, that adjusting the cloud computing resource from the present state configuration to the desired state configuration comprises executing one or more operations classified as involving user confirmation;
  - based on the determination that adjusting the cloud computing resource involves executing, the one or more operations, generating a workflow representation for configuring the cloud computing resource from the present state configuration to the desired state configuration, wherein:
    - the workflow representation identifies a hierarchical arrangement for a set of tasks to be performed in configuration of the cloud computing resource, the set of tasks comprises (i) a first task that a user is permitted to configure through a user interface associated with the command line tool, the first task implemented on a first hardware platform, and (ii) a second task that the user is restricted from configuring through the user interface, the second task implemented on a second hardware platform that is different than the first hardware platform;
  - receiving, by the configuration processor and through the user interface, a user input associated with the set of tasks, wherein the user input specifies one or more configurations to the set of tasks specified by the workflow representation;
  - determining, by the configuration processor, that the user input specifies a configuration corresponding to the second task;
  - in response to determining that the user input specifies the configuration to the second task:
    - identifying, by the configuration processor, one or more template workflow representations from a repository of previously-generated workflow representations for prior configuration operations that configure the cloud computing resource from the present state configuration to the desired state configuration but do not include the second task;
    - providing, by the configuration processor and through the user interface, an indication for the user to replace the workflow representation with the one or more template workflow representations;
  - receiving, by the configuration processor and through the user interface, a second user input selecting a template workflow representation from the one or more template workflow representations, wherein the template workflow representation selected by the user is associated with a second set of tasks;
  - in response to receiving the second user input, configuring, by the configuration processor, the cloud computing resource according to the template workflow representation selected by the user.

9. The system of claim 8, wherein the hierarchical arrangement of tasks specified in the workflow representation indicates a sequence for executing the set of tasks.

10. The system of claim 9, wherein the hierarchical arrangement for the set of tasks specified in the workflow representation indicates, for each task included in the set of the tasks:
- a set of one or more operations to be performed during execution of a particular task; and one or more execution parameters associated with each of the one or more operations included in the set of one or more operations.

11. The system of claim 10, wherein the user interface enables the user to provide one or more user inputs to adjust values for the one or more execution parameters.

12. The system of claim 8, wherein the set of tasks specified by the hierarchical arrangement of tasks comprises:
- the first task to delete an existing instance of the cloud computing resource;

the second task to create a new instance of the cloud computing resource; and a third task to migrate one or more components presently configured to the existing instance to the new instance.

13. The system of claim 8, wherein the operations further comprise:

obtaining, through the user interface, data indicating a confirmation by the user to initiate adjustment of the cloud computing resource from the present state configuration to the desired state configuration;

in response to obtaining the data indicating a confirmation by the user to initiate adjustment of the cloud computing resource from the present state configuration to the desired state configuration, generating a configuration instruction based on the workflow representation; and providing the configuration instruction to a configuration server associated with the cloud computing resource.

14. At least one non-transitory computer-readable storage device storing instructions that are executable by one or more computing devices configured to execute a command-line tool for configuring a cloud computing resource and comprising a state processor and a configuration processor, wherein the instructions cause the one or more computing devices to perform operations comprising:

obtaining, by the state processor, data indicating (i) a present configuration state of the cloud computing resource, and (ii) a desired state configuration of the cloud computing resource;

determining, by the state processor, that adjusting the cloud computing resource from the present state configuration to the desired state configuration comprises executing one or more operations classified as involving user confirmation;

based on the determination that adjusting the cloud computing resource involves executing, the one or more operations, generating a workflow representation for configuring the cloud computing resource from the present state configuration to the desired state configuration, wherein:

the workflow representation identifies a hierarchical arrangement for a set of tasks to be performed in configuration of the cloud computing resource, the set of tasks comprises (i) a first task that a user is permitted to configure through a user interface associated with the command line tool, the first task implemented on a first hardware platform, and (ii) a second task that the user is restricted from configuring through the user interface, the second task implemented on a second hardware platform that is different than the first hardware platform;

receiving, by the configuration processor and through the user interface, a user input associated with the set of tasks, wherein the user input specifies one or more configurations to the set of tasks specified by the workflow representation;

determining, by the configuration processor, that the user input specifies a configuration corresponding to the second task;

in response to determining that the user input specifies the configuration to the second task:

identifying, by the configuration processor, one or more template workflow representations from a repository of previously-generated workflow representations for prior configuration operations that configure the cloud computing resource from the present state configuration to the desired state configuration but do not include the second task;

providing, by the configuration processor and through the user interface, an indication for the user to replace the workflow representation with the one or more template workflow representations;

receiving, by the configuration processor and through the user interface, a second user input selecting a template workflow representation from the one or more template workflow representations, wherein the template workflow representation selected by the user is associated with a second set of tasks;

in response to receiving the second user input, configuring, by the configuration processor, the cloud computing resource according to the template workflow representation selected by the user.

15. The at least one non-transitory computer-readable storage device of claim 14, wherein the hierarchical arrangement of tasks specified in the workflow representation indicates a sequence for executing the set of tasks.

16. The at least one non-transitory computer-readable storage device of claim 15, wherein the hierarchical arrangement for the set of tasks specified in the workflow representation indicates, for each task included in the set of the tasks:

a set of one or more operations to be performed during execution of a particular task; and one or more execution parameters associated with each of the one or more operations included in the set of one or more operations.

17. The at least one non-transitory computer-readable storage device of claim 16, wherein the user interface enables the user to provide one or more user inputs to adjust values for the one or more execution parameters.

* * * * *